US008151118B2

(12) United States Patent
Foster et al.

(10) Patent No.: US 8,151,118 B2
(45) Date of Patent: Apr. 3, 2012

(54) MASTER-SLAVE SECURITY DEVICES

(75) Inventors: David James Foster, Bellevue, WA (US); Shon Schmidt, Seattle, WA (US); David Jaroslav Sebesta, Redmond, WA (US); Curt Andrew Steeb, Redmond, WA (US); William J. Westerinen, Issaquah, WA (US); Zhangwei Xu, Redmond, WA (US); Todd L. Carpenter, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 804 days.

(21) Appl. No.: 11/668,446

(22) Filed: Jan. 29, 2007

(65) Prior Publication Data

US 2008/0183305 A1    Jul. 31, 2008

(51) Int. Cl.
H04L 29/06    (2006.01)
(52) U.S. Cl. ............................................ 713/189; 700/3
(58) Field of Classification Search .................. 713/189; 726/35, 36
See application file for complete search history.

(56) References Cited

U.S. PATENT DOCUMENTS

| | | | |
|---|---|---|---|
| 4,380,698 A * | 4/1983 | Butts ............................ 219/492 |
| 4,685,056 A | 8/1987 | Barnsdale, Jr. et al. |
| 5,774,670 A | 6/1998 | Montulli |
| 5,982,894 A * | 11/1999 | McCalley et al. ............ 340/5.21 |
| 6,249,868 B1 | 6/2001 | Sherman et al. .............. 713/168 |
| 6,334,150 B1 * | 12/2001 | Cromer et al. ................. 709/223 |
| 6,345,291 B2 | 2/2002 | Murphy, Jr. et al. |
| 6,357,007 B1 | 3/2002 | Cromer et al. |
| 6,394,905 B1 | 5/2002 | Takeda et al. |
| 6,463,537 B1 | 10/2002 | Tello et al. |
| 6,611,201 B1 * | 8/2003 | Bishop et al. ............. 340/426.21 |
| 6,832,251 B1 | 12/2004 | Gelvin et al. ................. 709/224 |
| 6,836,847 B1 | 12/2004 | Zinger et al. |
| 7,007,300 B1 | 2/2006 | Weber et al. |
| 7,058,968 B2 | 6/2006 | Rowland et al. |
| 7,107,458 B2 | 9/2006 | Oishi et al. |
| 7,124,170 B1 | 10/2006 | Sibert |

(Continued)

FOREIGN PATENT DOCUMENTS

EP    1519536    3/2005

(Continued)

OTHER PUBLICATIONS

International Search Report for PCT/US2008/051575 mailed May 26, 2008.

(Continued)

Primary Examiner — Jeffrey D Popham
Assistant Examiner — Tracy Mangialaschi
(74) Attorney, Agent, or Firm — Christopher J. Volkmann; Westman, Champlin & Kelly, P.A.

(57) ABSTRACT

A computer or other electronic device requiring physical integrity of its components, for example, a pay-per-use computer may use a master security device in communication with a plurality of slave security devices, known as security beans. Each security bean may be given a cryptographic key or keys for use in authenticating communication with the master security device. Each security bean may be coupled to an associated component and may have the ability to disable that associated component. In one embodiment, security bean has an analog switch that may be configured to block or attenuate a critical signal used by the associated component. The security bean may start up in the disable mode and respond to a verified signal from the master security device to enable its corresponding component.

15 Claims, 8 Drawing Sheets

U.S. PATENT DOCUMENTS

| | | | |
|---|---|---|---|
| 7,702,926 B2* | 4/2010 | Walmsley et al. | 713/194 |
| 2001/0048747 A1 | 12/2001 | O'Brien | |
| 2002/0073334 A1* | 6/2002 | Sherman et al. | 713/201 |
| 2003/0154384 A1 | 8/2003 | Mueller | |
| 2004/0148364 A1 | 7/2004 | Kim et al. | |
| 2004/0205190 A1 | 10/2004 | Chong et al. | |
| 2005/0091332 A1 | 4/2005 | Moro et al. | |
| 2005/0146006 A1 | 7/2005 | Yamazaki et al. | |
| 2005/0154898 A1 | 7/2005 | Chao | |
| 2005/0216757 A1 | 9/2005 | Gardner | |
| 2005/0235135 A1* | 10/2005 | Dao et al. | 713/1 |
| 2005/0242971 A1* | 11/2005 | Dryer | 340/870.11 |
| 2006/0026422 A1* | 2/2006 | Bade et al. | 713/164 |
| 2006/0036860 A1 | 2/2006 | Avramopoulos et al. | |
| 2006/0090204 A1* | 4/2006 | Ogiso | 726/22 |
| 2006/0129837 A1 | 6/2006 | Im et al. | |
| 2006/0161750 A1 | 7/2006 | Perkins et al. | |
| 2006/0288428 A1 | 12/2006 | Ng et al. | 726/36 |
| 2007/0192825 A1 | 8/2007 | Frank et al. | 726/1 |

FOREIGN PATENT DOCUMENTS

| | | |
|---|---|---|
| EP | 1626579 | 2/2006 |
| EP | 1681799 | 7/2006 |
| KP | 10-2006-0103600 | 10/2006 |
| KP | 10-2006-0110383 | 10/2006 |
| WO | WO 2004/110832 | 12/2004 |
| WO | WO-2005-018161 | 2/2005 |
| WO | WO 2005/065009 | 7/2005 |
| WO | WO 2006/082296 | 8/2006 |

OTHER PUBLICATIONS

Written Opinion for PCT/US2008/051575 mailed May 26, 2008.

"hp ProtectTools Embedded Security—expanding trust within the enterprise computing environment," Hewlett-Packard Development Company, L.P., May 2003, http://www.hp.com/sbso/security/HP-protect-tools-embedded-security.pdf.

Huang, A., "Keeping Secrets in Hardware: the Microsoft XBoxTM Case Study," Massachusetts Institute of Technology, 2002, http://web.mit.edu/bunnie/www/proj/anatak/AIM-2002-008.pdf.

Gassend, et al., "Silicon Physical Random Functions", ACM, 2002, http://delivery.acm.org/10.1145/590000/586132/p148-gassend.pdf?key1=586132&key2=4511534611&coll=GUIDE&dl=GUIDE&CFID=6967847&CFTOKEN=79753986.

Schuts, K., "Trusted Platforms for Homeland Security," Arntel Corporation, 2004, http://atmel.com/dyn/resources/prod_documents/doc5062.pdf.

International Search Report and Written Opinion for related application PCT/US2008/051968 mailed May 29, 2008.

Weimerskirch et al., "A Distributed Light-Weight Authentication Model for Ad-hoc Networks," http://www.accenture.com/NR/rdonlyres/F163DCA4-7C4A-4279-B1DC-00A096CC8DB4/0/adhocauth.pdf.

Papadimitratos et al., "Securing Mobile Ad Hoc Networks," http://www.cs.plu.edu/courses/CompSec/arts/0279.pdf.

Prosecution History for related U.S. Appl. No. 11/668,445: Preliminary Amendment filed Apr. 10, 2007; Preliminary Amendment filed Jan. 24, 2008; Office Action mailed Feb. 3, 2010; Amendment filed May 10, 2010; Final Office Action mailed Jul. 19, 2010; Amendment After Final filed with Request for Continued Examination on Sep. 14, 2010; Office Action mailed Nov. 16, 2010; Amendment filed Feb. 16, 2011; Final Office Action mailed May 13, 2011; Examiner's Interview Summary mailed Aug. 19, 2011.

Markham et al., "Security at the Network Edge: A Distribution Firewall Architecture" IEEE, 2001, http://www.cs.plu.edu/courses/corpsec/art's/0279.pdf.

* cited by examiner

MASTER-SLAVE SECURITY DEVICES

RELATED APPLICATIONS

This application is related to co-pending application with Ser. No. 11/668,442, filed on the same day with this application.

BACKGROUND

When a business model allows selling a product at little or no cost and recoups the product's cost by selling services, such as with cellular phones, a key element is the ability to render the product useless if the terms of the service contract are not fulfilled. For example, if a cellular phone service subscriber fails to pay the agreed-to monthly fee, the service provider can simply turn off the phone's access to the network. Because the value of the phone is extremely limited if it cannot make phone calls, the service provider's investment is protected. Further, because the cellular phone may have little or no street value, there is little incentive to defraud the service provider for the sole purpose of getting an inexpensive cellular phone.

However, a subsidized computer may have considerable use and value when not connected to a network. Therefore, a business model that supplies computers or other high intrinsic value electronic devices to consumers at a subsidized initial cost along with a services contract, e.g. Internet service access, must have a way of limiting access to the computer when the terms of contract are not fulfilled. Given the sophistication and ingenuity of hackers, it may be difficult, if not impossible, to provide cost effective protection from every possible hack. One significant danger is a software-only hack that can be virally spread through the Internet and executed using a script.

SUMMARY

To counter widespread hacking attempts, a computer or other electronic device may be protected, at least in part, using small, inexpensive security elements, or security beans that operate in conjunction with a security master device. Even though an individual security bean may not pose a significant hurdle to a hacker, the cost and risk of damage to a computer when faced with disabling a multitude of security beans may deter most hackers. Cryptographically personalizing each security bean may require that a software hack extract a key for each security bean or device, raising the bar for a successful software hack. Further, because the security bean itself may be implemented with a very small footprint, the security beam may be incorporated on the same chip with other devices, such as controllers and I/O managers.

One embodiment of a security bean incorporates an analog switch that may be selectively turned on or off by an event. The event may be a signal from the security master device or may be internally generated by a timer when a heartbeat signal is not timely received. To keep costs down, the security bean may use a hardware-based communication protocol and have limited computational and memory capacity. Each security bean may have a unique secret for securing communication between the security bean and the security master device and to increase the burden on a hacker of extracting keys for each separate security bean. The use of unique secret keys increases the difficulty of a software attack. Sheer numbers, in one embodiment, dozens, of security beans can increase the cost of a hardware attack accomplished through removing or jumpering over security beans. The cost of hardware attacks can be increased dramatically when security beans are built into larger, high function chips, such as a Northbridge or Southbridge.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
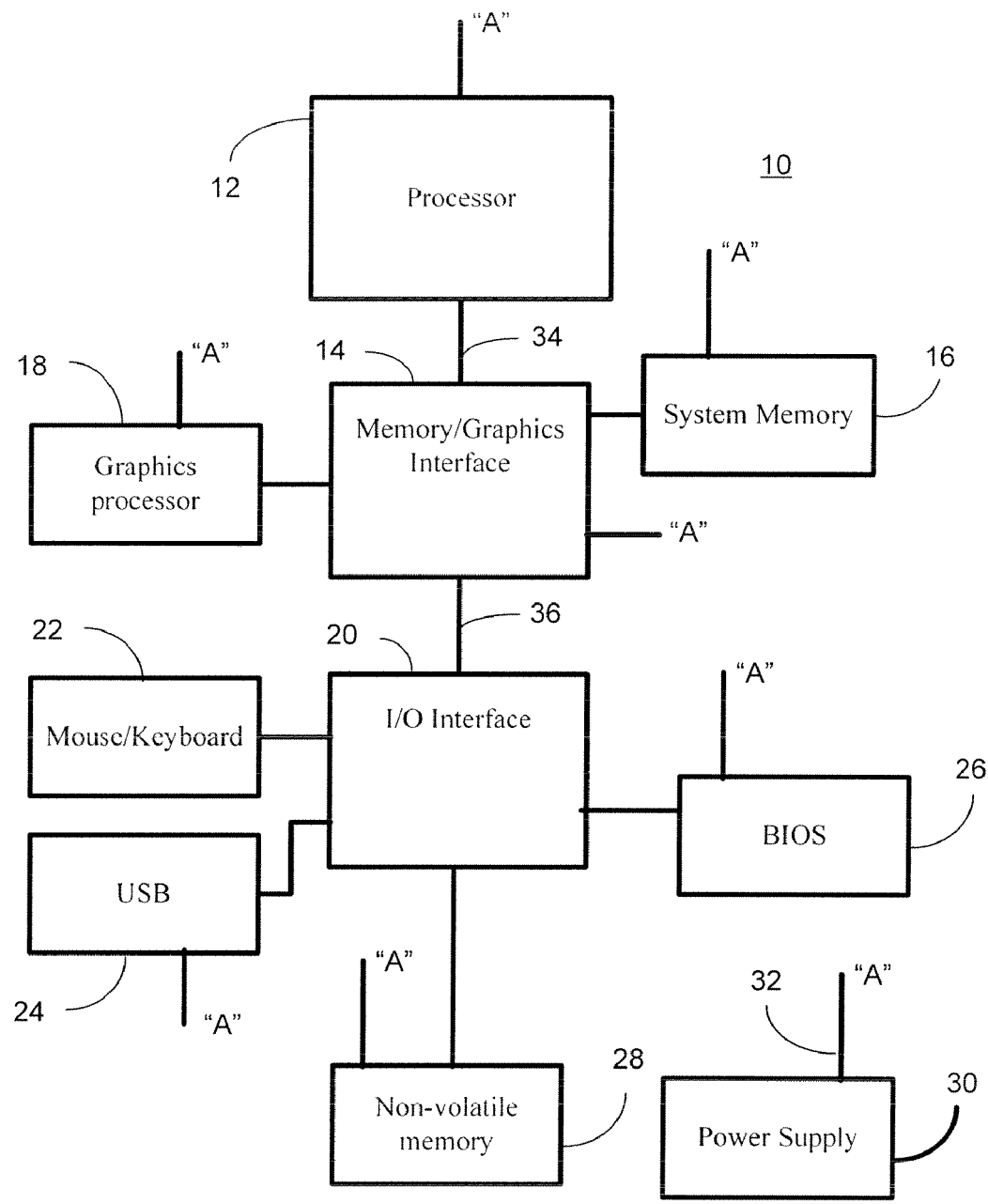
FIG. 1 is a simplified and representative block diagram of a prior art computer.

FIG. 1 is an architectural diagram of a prior art computer 10, representing a number of similar architecture electronic devices, including but not limited to, cellular telephones, personal digital assistants, media players, gaming systems, etc. The architecture of the computer 10 may be typical of general-purpose computers widely sold and in current use. A processor 12 may be coupled to a graphics and memory interface 14. The graphics and memory interface 14 may be a "Northbridge" controller or its functional replacement in newer architectures, such as a "Graphics and AGP Memory Controller Hub" (GMCH). The graphics and memory interface 14 may be coupled to the processor 12 via a high speed data bus 34, such as the "Front Side Bus" (FSB), known in computer architectures. The processor 12 may also be connected, either directly or through the graphics and memory interface 14, to an input/output interface 20 (I/O interface), for example, by high speed bus 36. The I/O interface 20 may be coupled to a variety of devices represented by, but not limited to, the components discussed below. The I/O interface 20 may be a "Southbridge" chip or a functionally similar circuit, such as an "I/O Controller Hub" (ICH). Several vendors produce current-art Northbridge and Southbridge circuits and their functional equivalents, including Intel Corporation.

A variety of functional circuits may be coupled to either the graphics and memory interface 14 or the I/O Interface 20. The graphics and memory interface 14 may be coupled to system memory 16 and a graphics processor 18, which may itself be connected to a display (not depicted). A mouse/keyboard 22 may be coupled to the P/O interface 20. A universal serial bus (USB) 24 may be used to interface external peripherals including flash memory, cameras, network adapters, etc. (not depicted). Firmware, such as a basic input output system (BIOS) 26 may be accessed via the I/O interface 20. Non-volatile memory 28, such as a hard disk drive or any of a number of other non-volatile memories, may also be coupled to the I/O interface 20.

The power supply 30 may be used to supply energy to each of the devices in the computer 10. A power supply output 32 is marked on FIG. 1 with the letter A. In one embodiment, the power supply output 32 is the actual power source for the operational components. In another embodiment, the power supply output 32 may be a "power OK" signal that is used by the other devices to determine when the power supply is stable and at the correct voltage for operation. The other devices may then begin a power on sequence.

Figure 2:
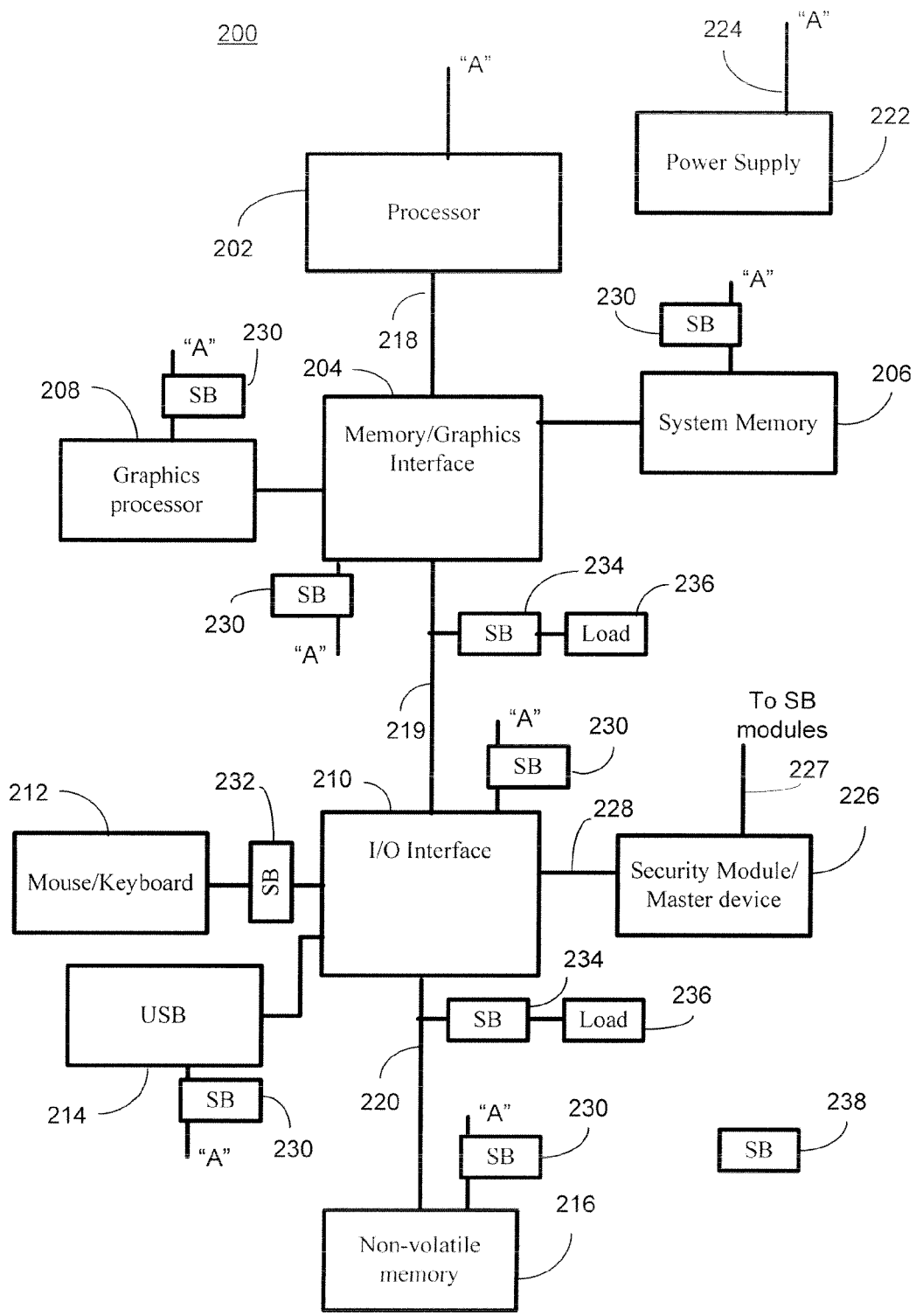
FIG. 2 is a block diagram of a simplified and representative computer in accordance with the current disclosure.

FIG. 2 illustrates a computer 200, or other processor-based device, as listed above, adapted for use with a master-slave security device or devices. Similar to the apparatus in FIG. 1, the computer 200 may have a processor 202, and two major support chips: a memory/graphics interface 204 and an I/O interface 210, e.g. a Northbridge and a Southbridge. The memory/graphics interface 204 may support a graphics processor 208 and system memory 206. The graphics processor 208 may be coupled to a monitor or other display (not depicted). The I/O interface 210 may support a mouse/keyboard 212 or other input devices. A universal serial bus (USB) 214 may be used to inter face external peripherals including flash memory, cameras, network adapters, etc, (not depicted). Non volatile memory 216, such as a hard disk drive or any of a number of other non-volatile memories, may also be coupled to the I/O interface 210. A master device 226 may include memory storing, one or more BIOS images for use in booting the computer 200. The master device 226 may also include other function is associated with metering and other system verification and enforcement measures. For the purpose of clarity, those aspects of the master device 226 will not be discussed in this disclosure. The master device 226 may have separate communication channels, a first channel 227 may be used to communicate with slave security devices, or "security beans" (SBs). The second channel 228 may be coupled conventionally to the I/O interface 210. Additional communication channels may be supported, for example, a separate communication channel for each configuration of security devices (see below).

The processor 202 and memory/graphics interface 204 may be connected as above, with a front-side bus 218. The memory/graphics interface 204 to I/O interface 210 connection may be a high speed system bus 219. The system bus 219 may be used to generate clock signals for other high speed buses, such as an I/O interface 210 to non-volatile memory 216 interface 220. Other configurations of system components, including processors with integrated memory controllers, known in the industry, or alternative bus structures, such as Hypertransport®, may also be used.

A power supply 222 may have a signal output 224 indicating when the power supply is at voltage and stable. As discussed above, the power supply may have one or more outputs (not depicted) coupled to each active system component. For the purpose of this discussion, output 224 will be presumed to be a "power OK" signal, but other signals, including the power bus lines themselves, may be involved. Each component with a power OK input will remain non-operational until the power OK signal input transitions to a designated active state, for example, a logic 1 value.

As will be discussed in more detail below with respect to FIG. 3, a security device or a security bean (SB) may operate as a connect/disconnect switch between two points and may be installed in any of several configurations. In a first configuration, one or more security beans 230 may be coupled in a serial fashion to the power OK input of a number of system components, including the memory/graphics interface 204, system memory 206, graphics processor 208, USB port 214, and nonvolatile memory 216. In this configuration the switching function in the security bean 230 may start in the normally off (disconnected) mode and block the power OK signal 224 from the power supply 222, effectively disabling each connected component. When the master device 226 determines that criteria have been met for operations, the master device 226 may send an activation signal to each of the security beans 230 instructing each one to close its switching function and couple the power OK signal 224 to its respective component, allowing that component to start in a normal fashion.

In another configuration of the slave device, security bean 232 is shown coupled between the mouse/keyboard 212 and the I/O interface 210. As above, the default configuration for the security bean 232 may be with switch function open, blocking any signals between the mouse/keyboard 212 and the I/O interface 210. When the master device 226 determines that criteria have been meant for operations, the master device 226 may send instructions to close the switching function and enable the mouse/keyboard 212. Because the security device authentication process may be completed very early in the boot process, the mouse/keyboard 212 may be active prior to BIOS system checking, so initial blocking should not cause a system error. Alternatively, because in some embodiments the BIOS is hosted in the master device 226 and may be aware of the security bean 232, the BIOS may be able to selectively activate devices during initial system checking when booting.

Another configuration of the slave device is illustrated by security bean 234 and associated load 236, shown in this exemplary embodiment attached to system buses 219 and 220, or more specifically, to a single signal path on each respective bus. In this configuration, the security bean 234 switch function may be normally closed, coupling load 236 to the respective bus 219 or 220. Coupling the load 236 to a bus may alter the transmission characteristics sufficiently to render the bus inoperable, for example, if coupled to a clock line. Additional security beans configured in this fashion may be attached to multiple lines of a data bus, thereby disabling each respective data line.

Lastly, security bean 238 is shown unattached. One or more unattached security beans 238 may be placed in an electronic device, and even coupled to signal connections, such as a ground plane, to act as decoys to further raise the bar of disabling active security beans 230 232 234. Depending on the exact design of the security bean, e.g. bean 230, the security bean have a material cost of well less than a dollar, allowing widespread deployment without significant impact on end-user price, while creating a significant cost of hacking in terms of time, tools, and risk of damage to the computer or other protected electronic device. Additional decoys, or dummy devices, may be attached to real components but factory-set to perpetual mode (see below) so that they do not participate in communication between the master device and other security beans. Such devices may also be loaded with dummy keys to obfuscate key extraction efforts. In other embodiments, decoy devices may be in communication with the master device 226 and respond to ping requests, although have no connection to other components in the electronic device.

Other configurations of masters and security beans may be implemented. For example, some implementations may use multiple masters with either separate or overlapping coverage on associated security beans. That is, one security bean may respond to more than one master, or the beans on a system may each respond to one of the multiple masters. As with dummy security bean 238, a second or more master devices simply increases the difficulty of hacking a system. As discussed more below regarding initial setup, the security beans may be randomly assigned to master devices to help prevent 'cookbook' attacks.

As mentioned above, an alternative embodiment may be to place security bean circuitry in major components, such as the Northbridge, Southbridge, their equivalents, or other high activity components, such as network interface card. In some cases, additional, separate I/O could be used for communication with such security circuitry, but in most cases, it is likely that such communication would be through whatever port or bus the component already uses. When this is the case, the base circuitry of the component may require additional functionality to route communications with the security bean that arrive or are sent over the standard port.

Figure 3:
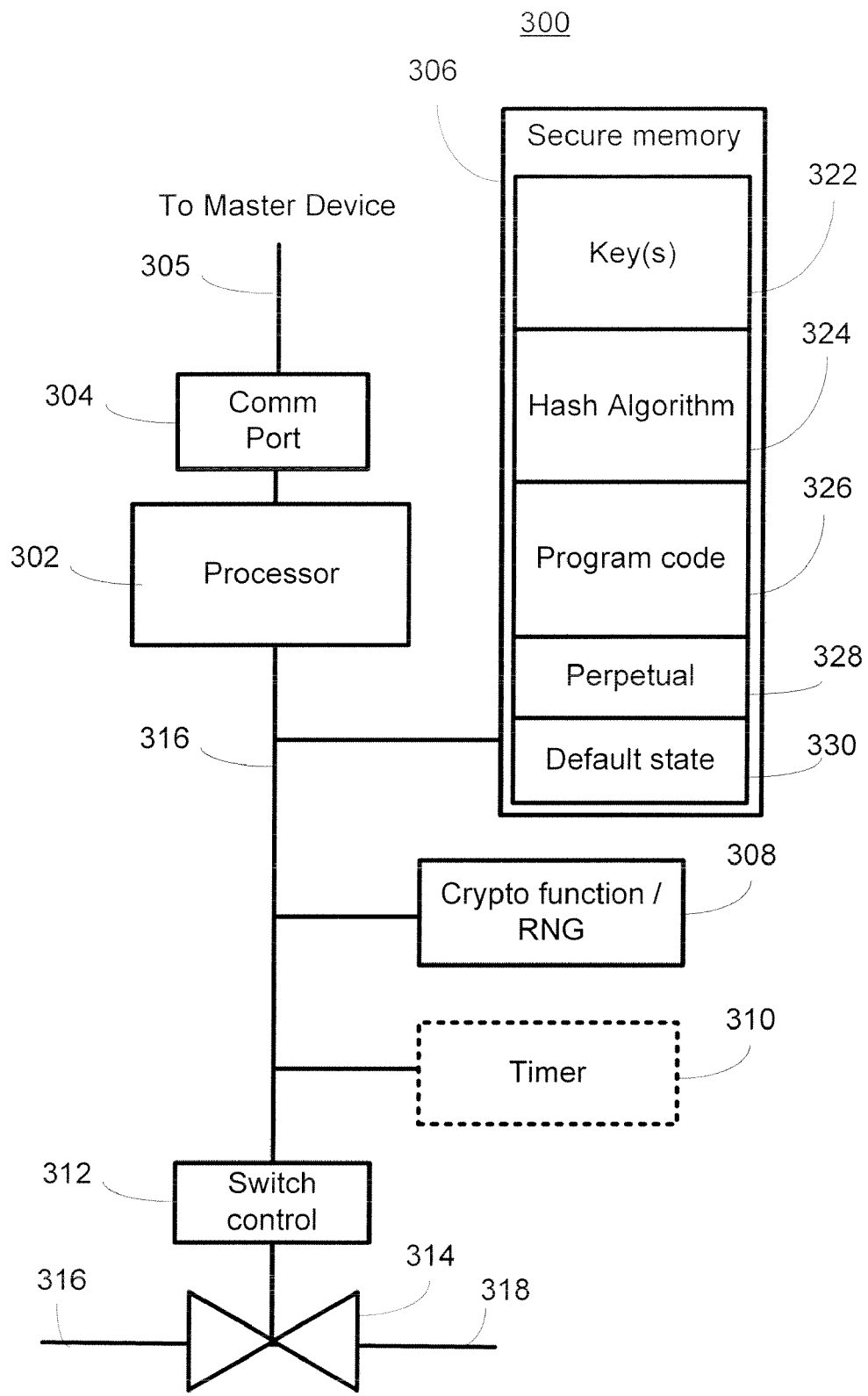
FIG. 3 is a simplified and exemplary block diagram of a security device or security bean.

FIG. 3 is a simplified and exemplary block diagram of a security device, also known as a slave device or a security bean 300. A processor 302 may execute programs and control communications with a master device, such as the master device 226 of FIG. 2. A communications port 304 may manage communication protocol over interface 305, such as a serial peripheral interface (SPI). The security bean 300 may also include a secure memory 306, a cryptographic function 308, an optional timer 310, a switch control 312, and a switch 314 with an input coupling 316 and an output coupling 318.

The processor 302 may be a microprocessor with a standard or reduced instruction set but may also be an application specific integrated circuit (ASIC) implementing simple logic or a state machine. The communication port 304 may be a dedicated port, may be a separate ASIC circuit implementing a communication protocol in hardware, or may be incorporated in the processor 302.

The secure memory 306 may include both volatile and nonvolatile memory for use in storing persistent data as well as for use by the processor 302 during operation. The secure memory 306 may include keys 322, a hash algorithm 324, and program code 326, as well as a perpetual flag 328 and a default state flag 330. The keys 322 may include a local master key accepted from a master device 226 during configuration with the master device 226. Derived keys, session keys, or local hash values may also be stored in the keys section 322. The hash algorithm 324 may be any of a number of known algorithms, such as MD5 or SHA-256. Program code 326 may be executable instructions that the processor 302 can use during both configuration and normal operation phases. The perpetual state 328 stored at in the secure memory 306 may be a simple flag used to indicate whether the security bean 300 should be permanently placed in a normal operating state or a so-called perpetual state. The perpetual state may be used to turn off all security functions in a computer. This may include setting the security bean 300 so that the computer can operate without any restrictions, for example, after a subscriber has successfully met contractual terms for a subsidized purchase and takes full ownership of the computer or electronic device. The default state 330 may be set to determine whether the default value (i.e. the state of the switch 314 required to disable its associated component) for switch control 312 is open or closed, depending upon the use of the security bean 300 in a circuit.

The cryptographic function 308 may include a hash function for use instead of or in conjunction with a hash algorithm 324 stored in the secure memory 306. The cryptographic function 308 may also include a random number generator (RNG) for use in challenge/response communication with the master device 226. The cryptographic function 308 may include general encryption/decryption functions which may be used, in part, for generating and verifying a message authentication code (MAC).

The optional timer 310 may be used as described below when the security bean 300 operates to disable its respective circuit unless reset during a timeout period, set by the timer 310.

The switch control 312 may be simple logic to convert a command from the processor 302 to control and persist the state of switch 314. Switch 314 may be an ordinary analog switch, known in the art. Even though signal lines 316 and 318 have been designated as an input coupling and output coupling respectively, in one embodiment, the signal lines 316 318 are interchangeable. In other embodiments, the switch 314 may be another form of control, such as a variable resistor, variable capacitor, current source or the like. These alternate forms of control may allow tuning performance beyond a simple on/off. For example, a bus speed or graphics controller clock rate may be controlled to impede, but not completely disable the associated component and, as a result, negatively affect performance, but not disable the entire computer.

During initial setup, a key may be accepted from the first party who presents a valid format key. Ideally, this operation would take place in a secure environment since the security bean 300 may not have a transport key for encrypting the communication link 305 during initial set up. The key may be derived key based on a security bean serial number and a master key installed in the master device 226. When multiple masters are used, the masters may alternate this binding process or use random responses from security beans to generate a split between a first master and one or more other masters. Additionally, the default state 330 may be set during initial setup so that the switch 314 is either normally on or normally off upon power up. The key memory 322 and default state flag 330 may be a write-once memory, such as a fusable link or other one-time programmable technology. In some embodiments, the perpetual flag 328 may also be a one-time programmable memory.

After installation, setup, and upon startup the security bean 300, the switch 314 may be set to the default state and the security bean 300 may wait for communication from the master device 226. Using a normal challenge/response, the master device 226 and the security bean 300 may mutually authenticate each other. The master device 226 can send a signal that sets the security bean 300 to enable its associated component, be it a power OK signal 224, a signal path 228, or a bus load 236. A dummy device 238 may be powered and may also be in communication with the master device 226, in order to further obfuscate the active devices.

As described below, several alternatives exist for security bean 300 operation, including but not limited to timeout, ping response, and a combination of the two. In timeout operation, the bean 300 begins a timeout period as soon as switch 314 is set to the enabled mode after power up. After a predetermined time the timer 310 may expire, for example, in one minute, and the switch 314 transitioned to disable its respective component. The timeout timer 310 may be reset by an authenticated signal from the master device 226. In another embodiment, the bean 300 may start in the enabled mode and begin its timing cycle without communication from the master device 226. The switch 314 may be set to disabled mode unless the timer is reset by the authenticated signal from the master device 226 during the timeout period.

In the ping response mode, the security bean 300 may start in the disabled mode and wait for an authenticated signal to switch to the enabled mode. Subsequently, the master device 226 may ping the security bean 300, to which the security bean 300 may reply. After collecting ping response data from all the security devices 300 installed and configured, the master device 226 may determine that enough beans 300 have not responded and a tampering problem may exist. At that point, the master device 226 may send a disable signal to all responsive security beans 300, causing them to switch to disabled mode. In some embodiments, the disable bit 330 may be set by the disable signal, so that during the next power cycle or reset cycle, the security bean 300 may stay in the disabled mode until explicitly turned off by the master device 226. This may be useful if the security bean 300 is configured to boot into an enabled mode.

The security bean 300 may store more than one version of key, so that a challenge/response transaction may include a key version for use in creating the appropriate session key. The security bean 300 may also store an encryption key and a signing key, when required by a particular protocol.

When contract terms have been satisfied, a host server (not depicted) or other trusted device, may send a signal to the master device 226 that the computer 200 should go perpetual, indicating that all security measures should be de-activated. In one embodiment, when the perpetual bit 328 is set, the security bean 300 may always boot to the enabled state, ignore the timer if present, and ignore messages from the master device 226. In another embodiment, the perpetual flag 328 may be reset, for example, when a computer is traded in for an upgrade and recycled.

Figure 4:
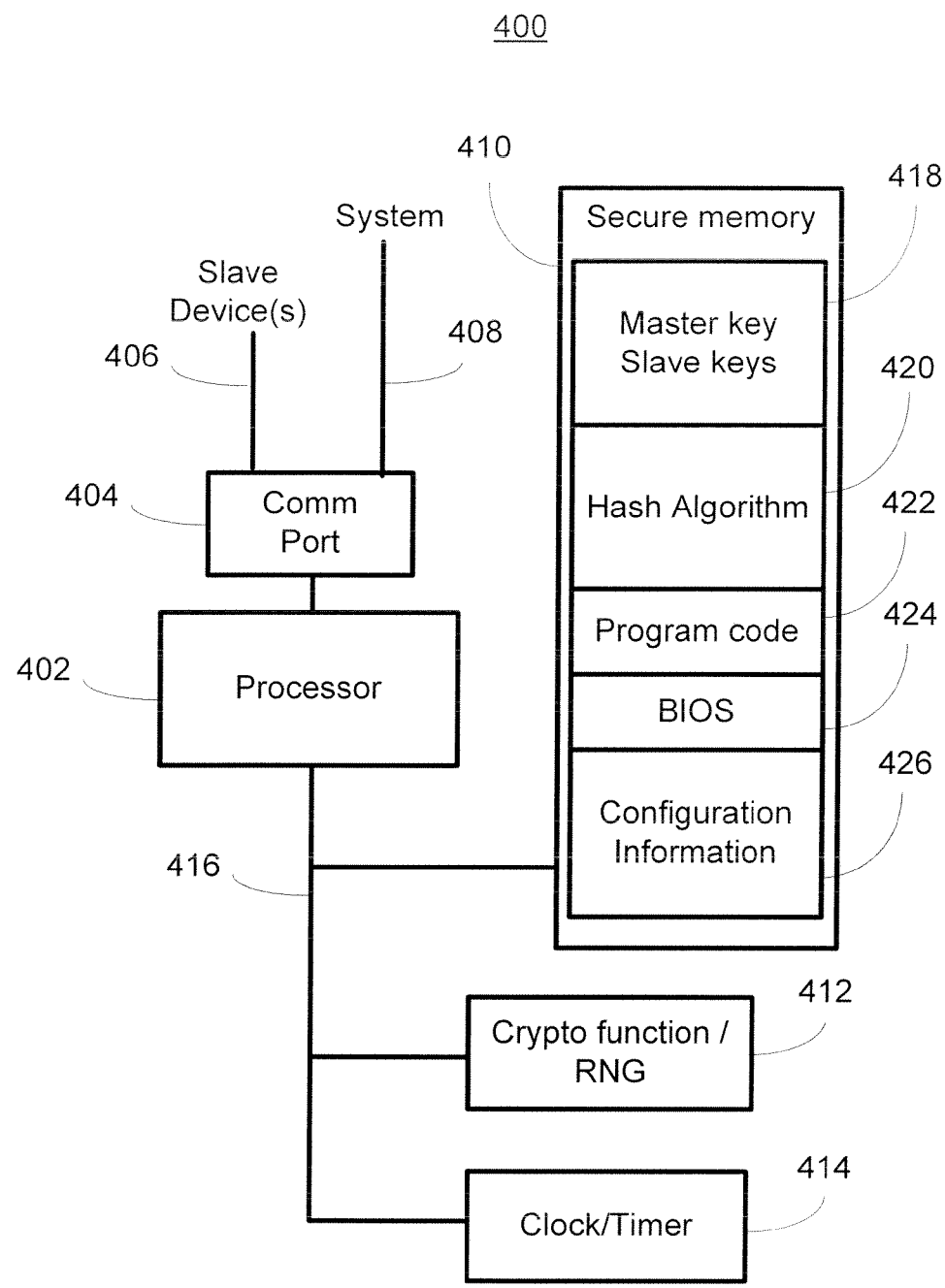
FIG. 4 is a simplified and exemplary block diagram of a master device.

FIG. 4, a simplified and representative block diagram of a master device 400, the same as or similar to the master device 226 of FIG. 2, is discussed and described. The master device 400 may include a processor 402, a secure memory 410, the cryptographic function 412 and a clock or timer 414 may be connected via internal bus 416. The processor 402 may be a core processor implemented in a custom or so accustomed design, or may be part of a single-chip computer, or may be one component in a multi-chip module (MCM). Communication port 404 may support more than one communication protocol, for example as depicted in FIG. 4, connection 406 supports communication with slave devices, such as slave device 300 of FIG. 3, using, for example, an SPI protocol. The communication port 404 may also support a conventional system bus interface for communication over system connection 408 to other components of a system incorporating the master device 400, such as the system 200 of FIG. 2.

The secure memory 410 may include key memory 418 storing a device master key and slave keys generated for each slave associated with the master device 400. A hash algorithm 420 may be stored in the secure memory 410 for use when a hash is calculated by the processor 402. Program code 422 may include executable code for managing the operation of the master device 400. In implementations where the master device 400 manages BIOS code, such BIOS code 424 may be stored in a secure memory 410. A secure boot, or at least a boot cycle using known BIOS code, may be necessary to ensure that the master device 400 and its associated security beans 300 are operational and enabled before boot processes associated with initially deactivated components begin. Configuration information 426 may be used to store information regarding known security beans, their mode of operation, and if perpetual mode is active.

The cryptographic function 412 may be as simple as a random number generator and a block cipher function, or may incorporate a smart chip with full cryptographic capability including public key algorithms, and communicate with the processor 402 using an ISO 7816 interface.

A clock or timer 414 may be used to determine timeout periods during which security beans 300 must respond to a ping. When the master device 400 also incorporates metering functions associated with pay-per-use operation, the clock or timer 414 may be directed to that purpose also.

In operation, the master device 400 may operate in one of several modes. In one embodiment, after cataloging and sending a derived key to each security bean 300, the master device 400 may periodically send an encrypted, or MAC'd, reset signal to each security bean 300. Upon verification of the reset signal, the bean may reset its timeout timer and normal operation is preserved. In another embodiment, the master device 400 may periodically ping each catalogued security bean 300. If enough security beans 300 do not respond in a timely fashion, the master device 400 may send a disable signal to each responsive security bean 300. Operation in this fashion is discussed in more detail below with respect to FIG. 7. A combination of operations may be supported, for example, the ping message from the master device 400 may also serve at the timeout timer reset signal at the security bean 300. In this way, should a signal line be cut, the master device 400 can disable the remaining security beans 300 and the disconnected security bean 300) call set itself to disabled mode.

Figure 5:
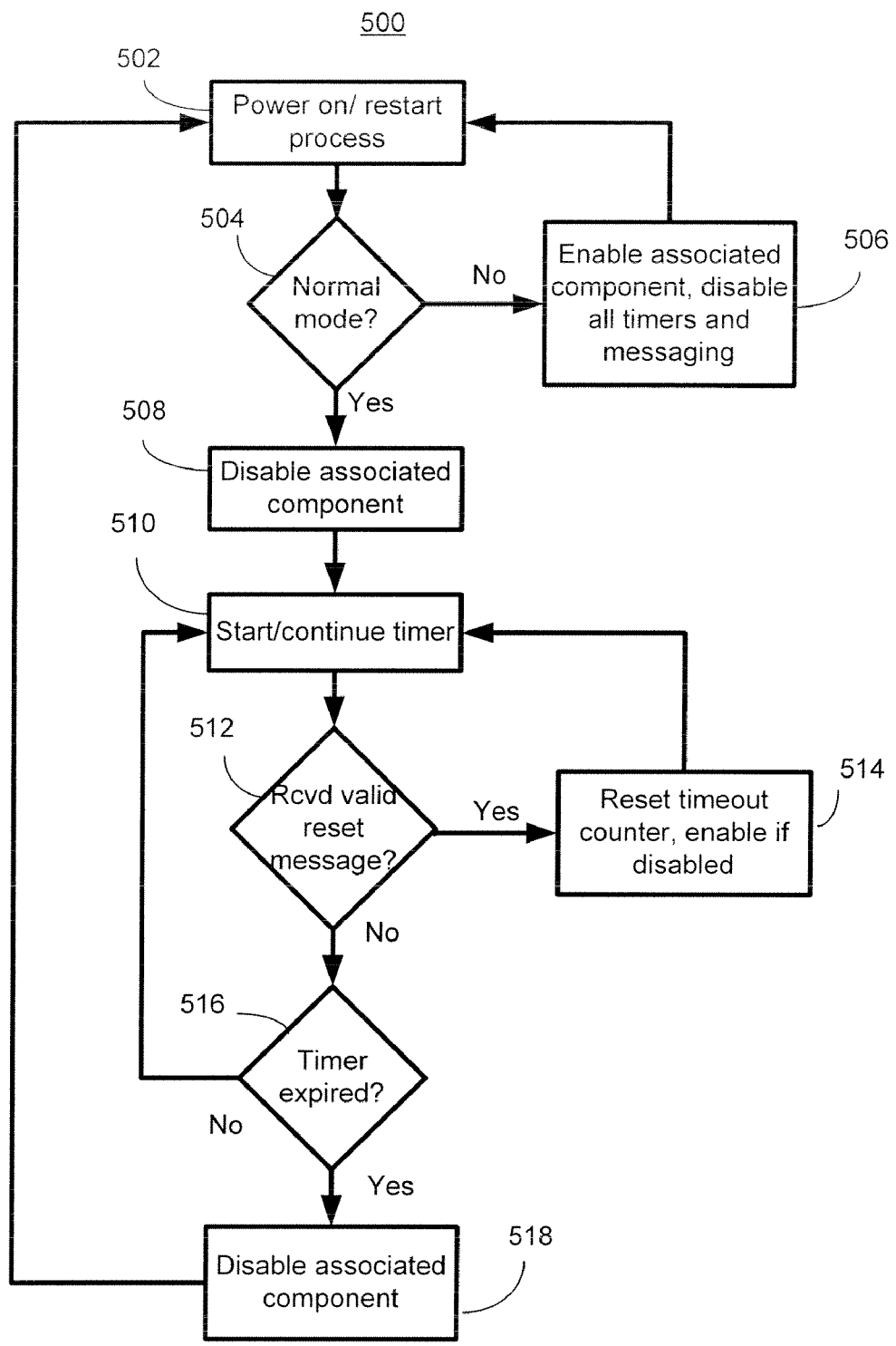
FIG. 5 is a flow chart depicting a method of operating a security bean.

FIG. 5 is a flow chart illustrating a method 500 of operating a security bean, such as a security bean 300 of FIG. 3. The security bean 300 may be assumed to have already been configured, that is, received at least a signing key and, optionally, a default value for a position of switch 314. At block 502, the security bean 300 may go through a power on restart process. At block 504 a determination is made whether the security bean 300 should boot in a normal mode or in a perpetual mode. If a perpetual flag, for example, perpetual flag 328 of FIG. 3, is set, the "no" branch from block 504 may be followed to block 506. At block 506, the security bean 300 may set itself to enable its associated component. In an embodiment where the perpetual mode permanently disables security, the security bean 300 may disable all timers and ignore any incoming messages to allow its associated component normal operation. As discussed with respect to FIG. 3, the security bean switch 314 may be open or closed to enable its associated component, depending upon configuration.

If, at block 504 the security bean 300 is to operate in the normal mode, that is, with security enabled, the "yes" branch from block 504 may be followed to block 508 and the security bean 300 may set its switch 314 to disable its associated component. To illustrate, if the switch 314 is in series with a power OK line, the switch 314 may be turned off to block the power OK signal to the associated component and the thereby disable it. In another embodiment, if the switch 314 couples a load 236 to a signal line, the switch 314 may be closed to disable the associated signal line. In other embodiments, with a different risk profile, the security bean 300 may be set to enable its associated component.

At block 510, a timer 310 may be activated and begin a predetermined countdown period. In one embodiment, the countdown period may be one second, although a range of countdown periods may be implemented from very short, for example, 1 ms to quite long, for example, several minutes, depending upon the number of security beans 300 and an assessment of risk.

At block 512, a message may be received from a master device 400. In one embodiment, the message may be validated by taking a hash of a message body, encrypting it with the local signing key, and comparing it with a message authentication code (MAC) value accompanying the message. If the validation passes, the "yes" branch from block 512 may be followed to block 514. If the switch 314 is in the disable position, it may be switched to the enabled position, for example, if this is the first time through this loop. The timeout timer may be reset to its initial value and operation continued at block 510 where the counter may begin counting down from the initial value. If, at block 512, the reset message is not valid the 'no' branch from block 512 may be followed to block 516.

If, at block 516, the timer has not expired, execution may follow the 'no' branch from block 516 to block 510 and the loop followed until either a valid reset message is received or the timer expires. If, at block 516, the timer has expired, the 'yes' branch from block 516 may be followed to block 518 and the switch 314 set to the disabled position. The security bean 300 may remain in that state until another power-on/restart process is initiated. In other embodiments, a path from block 518 to block 512 may exist allowing a reset message to be validated in the security bean 300 to set an enabled mode without a restart.

Operation of the master device 400 supporting the security bean operating mode described in FIG. 5 is straightforward. The master device 400 generates an authenticated reset message and sends it to each catalogued security bean 300 at a predetermined interval. The master device 400 may maintain information regarding the operating state of each catalogued security bean 300, but it is not necessary.

Figure 6:
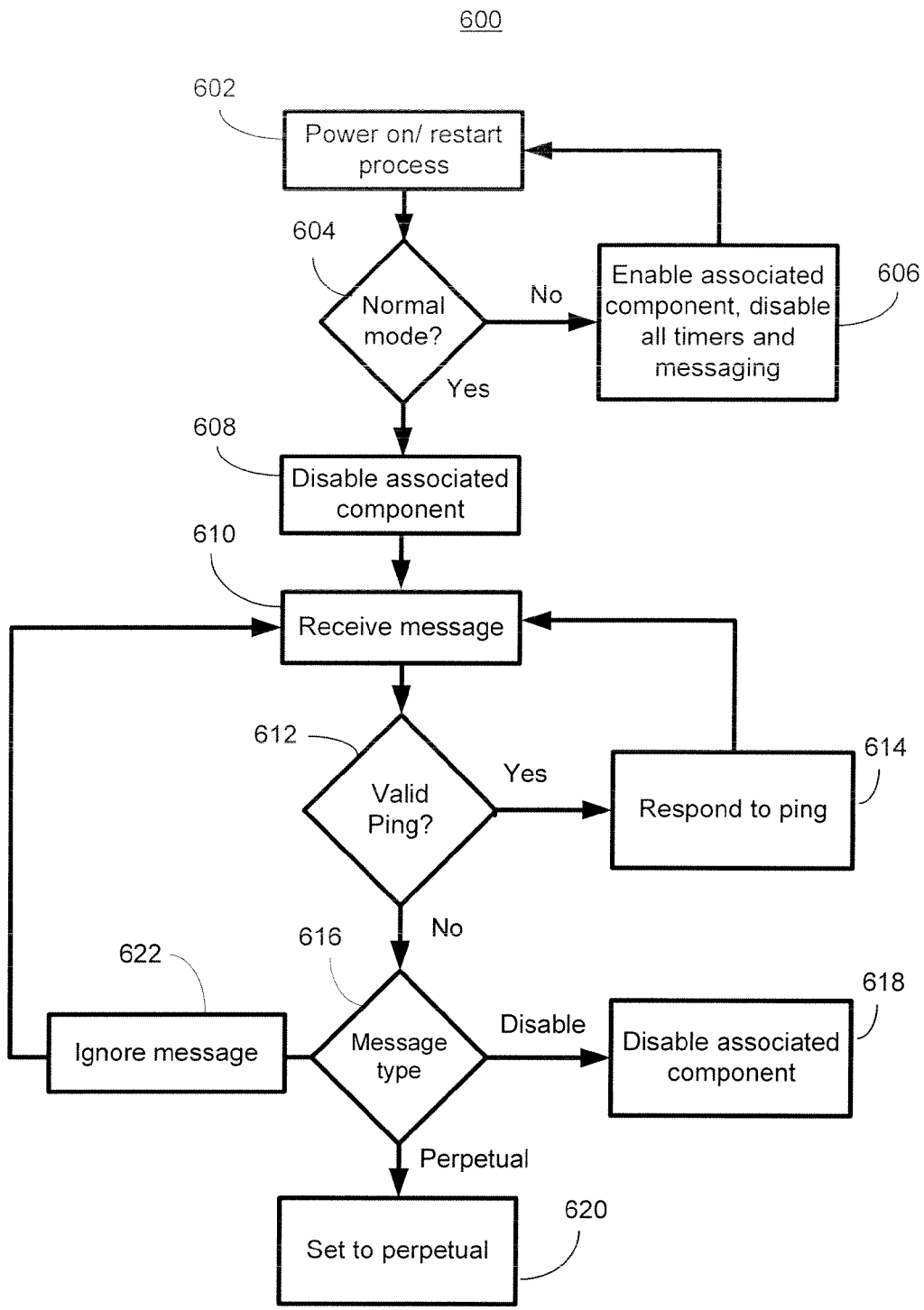
FIG. 6 is a flow chart depicting an alternate method of operating a security bean.

FIG. 6 is a flow chart illustrating another method 600 of operating a security bean 300 to help prevent tampering with a secure electronic device, such as a metered-use computer 200 depicted in FIG. 2. At block 602 a power-on/restart process may be initiated. At block 604, a determination may be made whether the computer 200 is to be used in a normal operating mode. If this is not true, for example, the computer 200 is to be used in a perpetual operating mode, the 'no' branch from block 604 may be followed to block 606 and the security bean 300 may be set to enable its associated component as well as to disable all timers and to ignore any further messages received.

If, at block 604, the determination is made to operate in the normal operating mode, the "yes" branch from block 604 may be followed to block 608. At block 608 the security bean 300 may set its switch 314 to disable its associated component. As discussed above, disabling the associated component may involve setting the switch 314 to either open or closed depending upon configuration. The disabled setting may be determined by referring to default state flag 330.

At block 610, a message may be received from the master device 400. At block 612, the security, bean 300 may determine if the message from the master device 400 is valid, for example, by checking the MAC code received with the message. If the message is not valid it may be discarded. If the message is valid, the message content may be parsed to determine if it is a ping message, that is, a message simply requesting a response and not necessarily a 'ping' message as defined by the Ethernet protocol. When the message is a ping, the "yes" branch from block 612 may be followed to block 614 and the security device 300 may respond to the ping with a MAC'd message using a previously installed symmetric key known to the master device 400.

If, at block 612, the message is not a ping, the 'no' branch from block 612 may be taken to block 616. At block 616, the message contents may be evaluated to determine the message type. If the message is a disable message, the "disable" branch from block 616 may be taken to block 618 in the security bean 300 set to disable its associated component. If the message type is perpetual, the "perpetual" branch from block 616 may be taken to block 620. At block 620, the security bean 300 may be set to enable its associated component and ignore any further pings or state change messages. If, at block 616 the message is unknown, the remaining branch from block 616 may be taken to block 622 the message ignored in the security bean 300 remain in a weight state for the next message.

Figure 7:
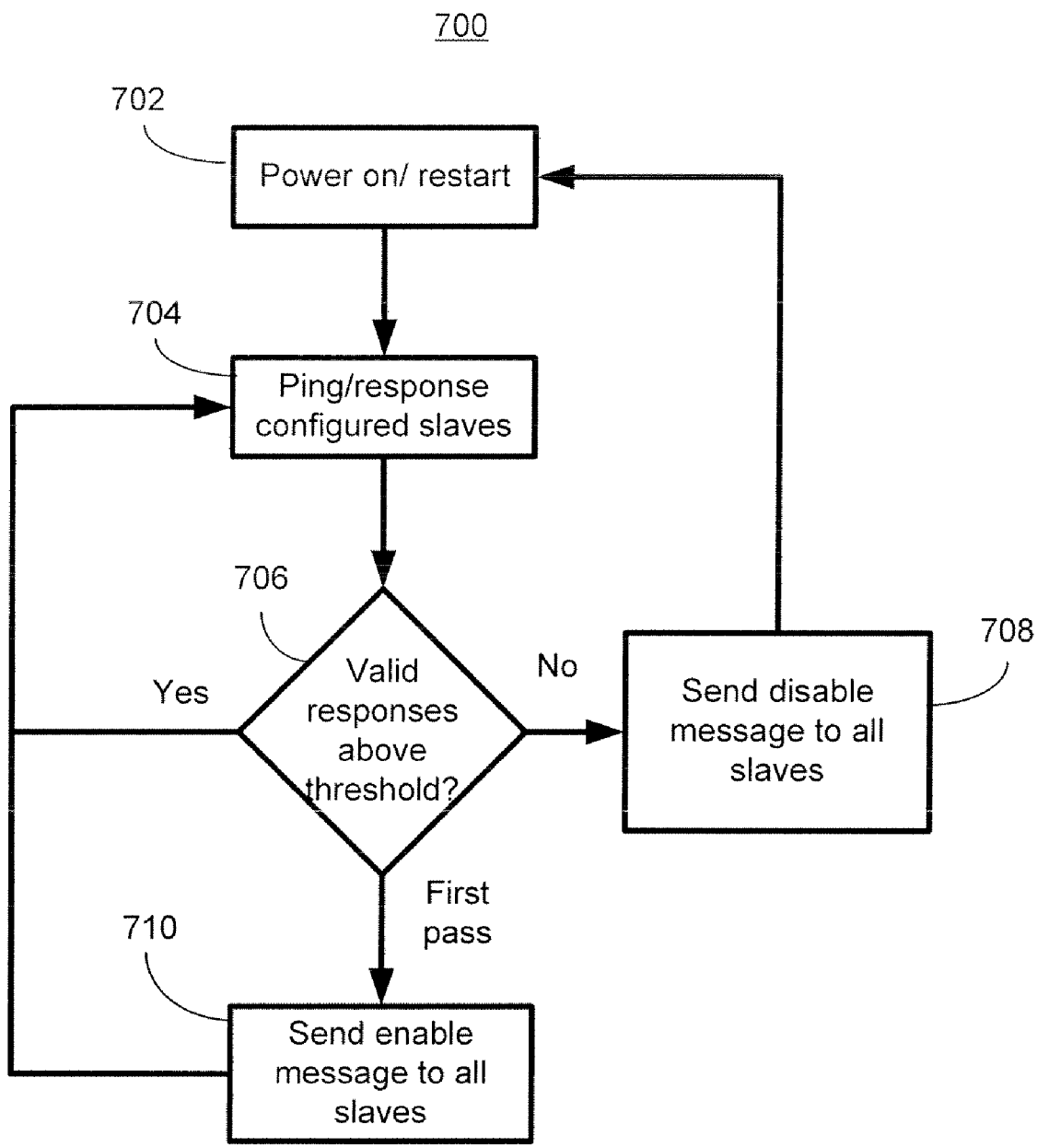
FIG. 7 is a flow chart depicting a method of operating a master device.

FIG. 7 is a method 700 of operating a master device, such as master device 400, in a ping mode corresponding to slave device operation described in FIG. 6. After a power-on/restart sequence at block 702 the master device 400 may begin a sequence at block 704 to ping each configured security bean, such as security bean 300 of FIG. 3. In block 706, the number of valid responses received may be compared to a threshold value corresponding to a required number of valid responses for normal operation. For example, in one embodiment, 75% of the catalogued devices must respond within a one second interval to reach the threshold value. 100% compliance may not be required, for example, to account for dummy devices, or if communication links are slow. If the threshold value is reached, and it is the first time through the loop after power-on/restart at block 702, the "first pass" branch from block 706 may be taken to block 710. An enable message may be sent to each catalogued security bean 300 indicating that their associated component devices should be enabled.

If, at block 706 the number of valid responses is above a threshold value and this is the second or more time through the loop, the "yes" branch from block 706 may be taken and the master device 400 may wait a predetermined interval before sending another ping at block 704. When, at block 706, the number of valid responses received during a response period does not reach the threshold value, the "no" branch from block 706 may be taken to block 708 and a disable message may be sent to each catalogued security bean 300.

Each catalogued, communicative, security bean 300 may then set itself to disable its associated component. In some embodiments, it may be expected that setting one or two security beans to disable their associated components will be sufficient to halt operation of the computer 200, or other electronic device.

Figure 8:
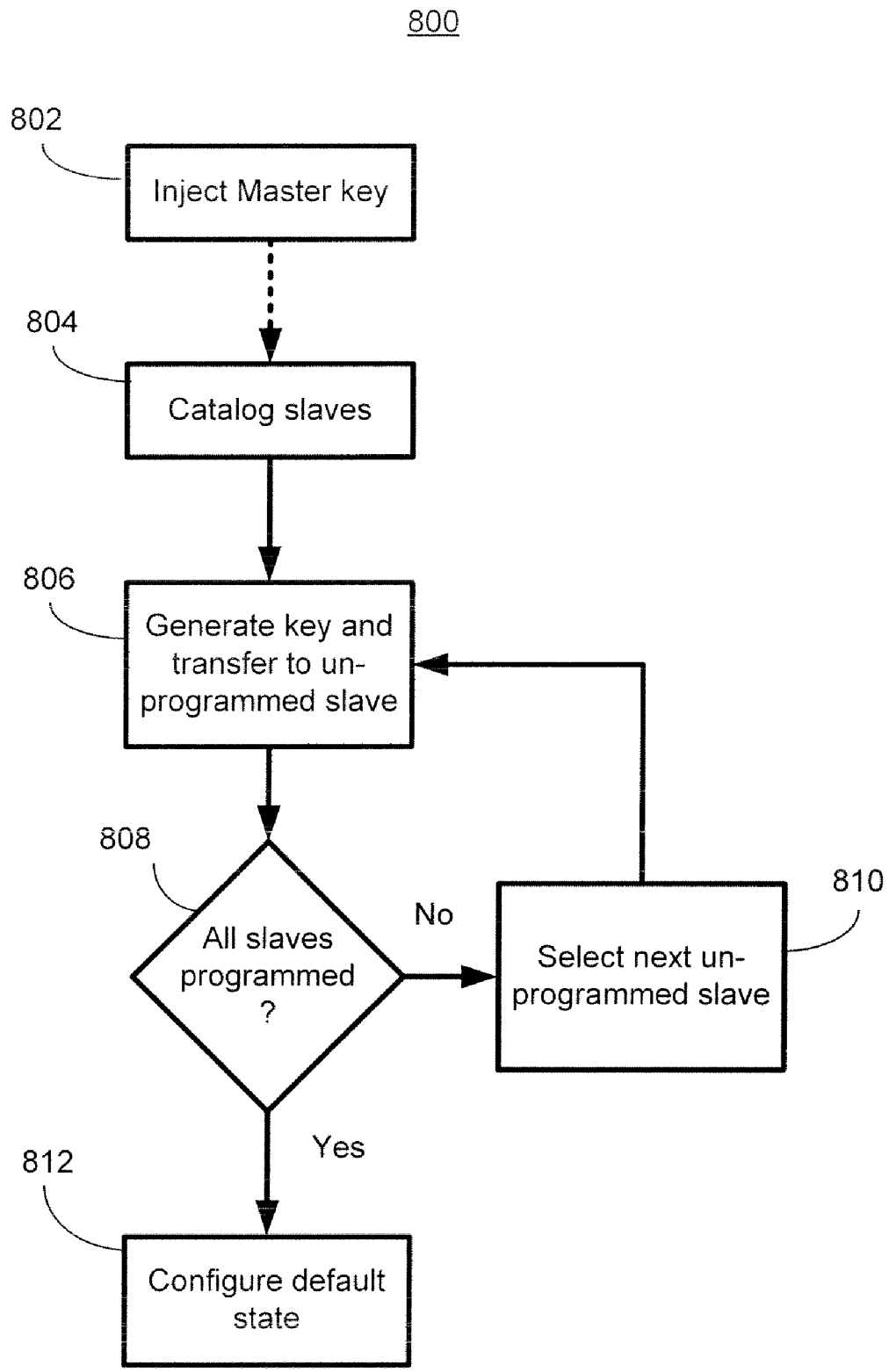
FIG. 8 is a flow chart depicting a method of configuring security beans to a master device.

FIG. 8 is a flow chart illustrating a method 800 of configuring a master device 400 and a plurality of associated security beans, such as security bean 300. At block 802, the master device 400 may be injected with a master key during a manufacturing, a test, or an assembly operation. At block 804, after installation and initial programming, the master device 400 may catalog each security bean 300, for example, using an anti-collision protocol based on a serial number of security bean 300. At block 806, the master device 400 may generate a key for a particular slave device. Using known techniques, the master device 400 may create a derived key using its own master key and slave device serial number or other identifier. In another embodiment, the master may generate an identifying number for a security bean 300, generate a unique derived key using this identifying number and send both the derived key and the identifying number to the security bean 300. In this fashion, a unique key can be programmed for each security bean 300. As mentioned above, both a signing key and an encryption key may be generated, depending on expected security protocols. After generation of the key or keys, the master device 400 may transfer the key, or keys, to the appropriate security bean. Using known techniques, the security bean may accept the key presented and install it in a write-once memory, for example, using fuse structures, or other known one-time write processes. In the interest of keeping costs low, this operation may be performed in the clear, in a secure manufacturing environment. However, more secure techniques using transport keys installed during the silicon manufacturing process may also be followed when more rigid security is required.

At block 808, a check may be made to determine if all associated security beans have been programmed. If not, the "no" branch from block 808 may be taken to block 810 and a next security bean may be selected for programming. If, at block 808, all the security beans have been reprogrammed the "yes" branch may be followed to block 812. At block 812, each security bean 300 may be set with the default state stored in memory location 330 based on whether its associated switch 314 should be open or closed to disable its associated component. In another embodiment, default state 330 may be set at the factory and designated, for example, by part number.

The use of a master device and a plurality of associated security beans provides a simple, low-cost but highly effective mechanism to enforce physical security in a device such as a pay-per-use computer or other electronic device with an on-going financial obligation. The highest levels of security, and its associated cost, may be confined to the master device while dozens of low cost, lower security devices spread throughout a computer can create an effective barrier to hardware hacking. Every attempt to remove, or jumper across, a security device can increase the risk of damage to the motherboard or associated components. Whether a particular security bean is normally open or normally closed further increases the level of complexity of a hardware hack. The use of dummy devices and multiple configurations of motherboards can make it more difficult to widely disseminate hacking information. Incorporation of security beans into other components, such as a Northbridge or a Southbridge, further increase the security of a system. The techniques described, in combination with other security measures, help to create a security barrier to effectively protect the assets of an underwriter or other entity bearing a financial risk in the sale of a subsidized computer or other electronic device.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A device for use in enforcing security in a system the device comprising:
   a timeout timer configured to be reset in response to receipt of a signal from a master device that is separate from the device;
   a processor, that at least in part, determines when an event has occurred, the event comprising an expiration of time at the timeout timer that occurs unless the device receives the signal from the master device that causes the timeout timer to reset;
   a cryptographic function coupled to the processor for authenticating communications with the master device;
   a switch coupled to the processor and responsive to a signal from the processor related to the event that blocks a "power OK" signal external to a corollary device, wherein blocking the "power OK" signal prevents the corollary device from beginning its power up sequence, and wherein the corollary device is coupled to and physically separate from the device; and
   a port coupled to the processor for communication with the master device, wherein the port is coupled to a communication channel dedicated to communication between the master device and one or more other devices, each of the other devices being substantially identical to the device and including a respective switch configured to block a "power OK" signal to a different, respective corollary device that is coupled to and physically separate from the other device.

2. The device of claim 1, wherein the corollary device is a bus and the switch is an analog switch that couples a load to the bus.

3. The device of claim 1, further comprising a memory for storing a cryptographic secret.

4. The device of claim 1, wherein the processor is operable to receive a ping from the master device and respond with an encrypted acknowledgement of the ping.

5. The device of claim 1, wherein the port communicates over one of a dedicated wired bus and wireless network.

6. The device of claim 1, wherein the port communicates over a bus associated with data traffic for the corollary device.

7. A method of binding components in a system, the method comprising:
   disposing a plurality of slave devices in the system, each slave device being coupled to and physically separate from a respective component of the system and including a respective switch capable of rendering inoperable the respective component of the system;

disposing a master device in the system wherein the master device sends a request message to each of the plurality of slave devices over a bus dedicated solely to communication between the master device and each of the plurality of slave devices;

determining a total of acknowledge messages received from the slave devices that are responsive to the request message;

sending a disable signal from the master device to each of the plurality of slave devices over the bus when the total of acknowledge messages responsive to the request message fails to meet a threshold level for acknowledgement messages; and at each of the plurality of slave devices, using the respective switch to impair operation of the respective component coupled to the slave device in response to receipt of the disable signal, the respective switch preventing the respective component from beginning its power up sequence by blocking a "power OK" signal.

8. The method of claim 7, wherein determining at the slave device when an event has occurred comprises determining at the slave device that the event has occurred wherein the event is a timeout of a watchdog timer when a timer reset signal from the master device is absent during a predetermined timeout period.

9. The method of claim 7, further comprising sending an acknowledgement from the slave device to the master device responsive to a request from the master device.

10. The method of claim 9, further comprising sending a cryptographically verifiable acknowledgement from the slave device to the master device responsive to a cryptographically verified request from the master device.

11. The method of claim 7, wherein the threshold level requires an acknowledge message responsive to the request message from less than all of the slave devices, wherein the disable signal is not sent from the master device to each of the plurality of slave devices if the total of acknowledge messages meets or exceeds the threshold level.

12. A system for securing an electronic device having a plurality of components, the system comprising:

at least three slave devices operable to disable one or more respective components, the slave devices comprising:

a first slave device operable to interrupt a power OK signal to a processor of the electronic device, wherein the power OK signal comprises a digital signal to the processor that indicates the processor should remain non-operational until the signal is active;

a second slave device operable to interrupt communications between a keyboard and an I/O interface module of the electronic device; and a third slave device operable to connect a load to a system bus that alters transmission characteristics of the system bus to render the system bus inoperable; and a security master in communication with each of the first, second, and third slave devices, wherein each of the one or more slave devices disables its respective components when communication between the security master and the slave devices fails to reach a predetermined threshold, wherein the predetermined threshold is indicative of successful communication two from the security master to less than all of the slave devices such that the slave devices do not disable their respective components when communication between the security master and the slave devices is at or exceeds the predetermined threshold.

13. The system of claim 12, wherein each of the slave devices comprises a timeout timer that disables its respective one of the plurality of components unless reset by an acceptable threshold of communication during a timeout period.

14. The system of claim 12, wherein each of the slave devices responds to a poll from the security master and is responsive to a disable message from the security master when a threshold number of the slave devices fail to respond to the poll.

15. The system of claim 12, further comprising a fourth slave device with only power connections and no functional connections to any of the plurality of components to act as a decoy.

* * * * *

UNITED STATES PATENT AND TRADEMARK OFFICE
CERTIFICATE OF CORRECTION

PATENT NO.        : 8,151,118 B2
APPLICATION NO.   : 11/668446
DATED             : April 3, 2012
INVENTOR(S)       : David James Foster et al.

It is certified that error appears in the above-identified patent and that said Letters Patent is hereby corrected as shown below:

In column 3, line 67, delete "function is" and insert -- functions --, therefor.

In column 14, lines 17-18, in Claim 12, after "the" delete "one or more".

In column 14, line 22, in Claim 12, after "communication" delete "two".

Signed and Sealed this
Ninth Day of October, 2012

David J. Kappos
*Director of the United States Patent and Trademark Office*